United States Patent [19]
Holtby

[11] Patent Number: 6,102,086
[45] Date of Patent: Aug. 15, 2000

[54] DRIP TRAY

[76] Inventor: Quinn Holtby, 3611-111B Street, Edmonton, Alberta, Canada, T6J 1G9

[21] Appl. No.: 09/285,932

[22] Filed: Apr. 2, 1999

[30] Foreign Application Priority Data

Apr. 7, 1998 [CA] Canada ................................. 2234323

[51] Int. Cl.[7] ........................................ B65B 1/04
[52] U.S. Cl. ........................ 141/86; 141/311 A; 220/573; 184/106
[58] Field of Search .................................. 141/86, 87, 88, 141/311 A; 220/571, 573; 184/106

[56] References Cited

U.S. PATENT DOCUMENTS

| | | | |
|---|---|---|---|
| 4,484,661 | 11/1984 | Evenson | 184/106 |
| 4,651,887 | 3/1987 | Patrick | 141/87 |
| 5,775,869 | 7/1998 | Bishop | 414/608 |

*Primary Examiner*—Steven O. Douglas
*Attorney, Agent, or Firm*—Christensen O'Connor Johnson & Kindness PLLC

[57] ABSTRACT

A drip tray includes, in combination, a plurality of trays having a bottom and a raised peripheral sidewall extending from the bottom to define a liquid retaining enclosure. The plurality of trays are arranged in edge to edge relation to form a grid-like pattern. The trays are detachably secured together in edge to edge relation to maintain the grid-like pattern.

7 Claims, 4 Drawing Sheets

DRIP TRAY

FIELD OF THE INVENTION

The present invention relates to a drip tray.

BACKGROUND OF THE INVENTION

Drip trays are used in a variety of situations to contain liquids. Drip trays are used to catch oil when changing an oil filter on an engine. Drip trays are used to catch drilling fluids when a drilling rig used in drilling an oil or gas well trips a drill string out of a borehole.

It is essential that a drip tray be of a size that is sufficient to cover the entire area where leakage may occur; to ensure that not just a portion but all drips are contained within the tray. It is also important that the drip tray be strong enough to be withstand dumping, without buckling under the weight of the entrapped liquids.

Larger coverage areas, therefore, require a drip tray that is large and heavy. Once filled with liquids, these large drip trays present handling problems. In order to dump large drip trays, a team of men is required or lifting equipment. By way of example, when a 4 foot×8 foot drip tray made from ½ inch thick steel plate is filled with liquid, it weighs tons.

SUMMARY OF THE INVENTION

What is required is a drip tray that is capable of providing coverage over a large area, but without the handling problems normally associated with drip trays of that size.

According to the present invention there is provided a drip tray that includes, in combination, a plurality of trays having a bottom and a raised peripheral sidewall extending from the bottom to define a liquid retaining enclosure. The plurality of trays are arranged in edge to edge relation to form a grid-like pattern. Means are provided for detachably securing the trays together in edge to edge relation to maintain the grid-like pattern.

Instead of using one large drip tray to cover a given area, the drip tray, as described above, covers the same area with a plurality of small trays that are secured together in edge to edge relation. This innovation simplifies both the transport and the dumping of the drip trays. It also enables drip trays to be made of thinner gauge steel, as the force exerted upon the peripheral sidewalls of any one drip tray when filled with liquid is only a fraction of the force exerted upon the peripheral sidewalls of one large drip tray when filled with the same volume of liquid.

There are a variety of means that can be used to secure the drip trays together to collectively cover a large area. One of such means will hereinafter be illustrated and fully described.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
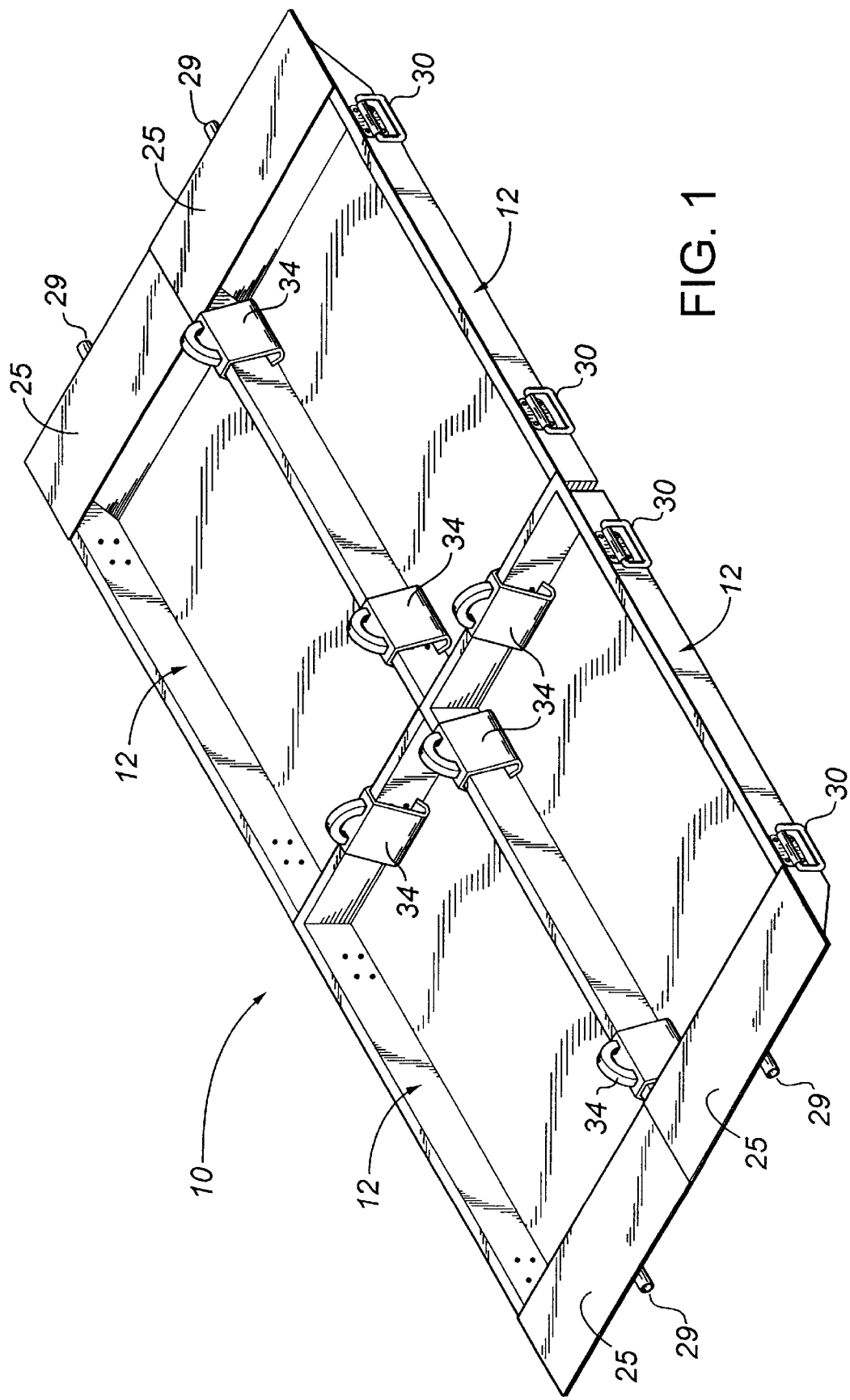
FIG. 1 is a perspective view of a plurality of drip trays connected in accordance with the teachings of the present invention to form an operative mode.

The preferred embodiment, a drip tray generally identified by reference numeral 10, will now be described with reference to FIGS. 1 through 6.

Figure 2:
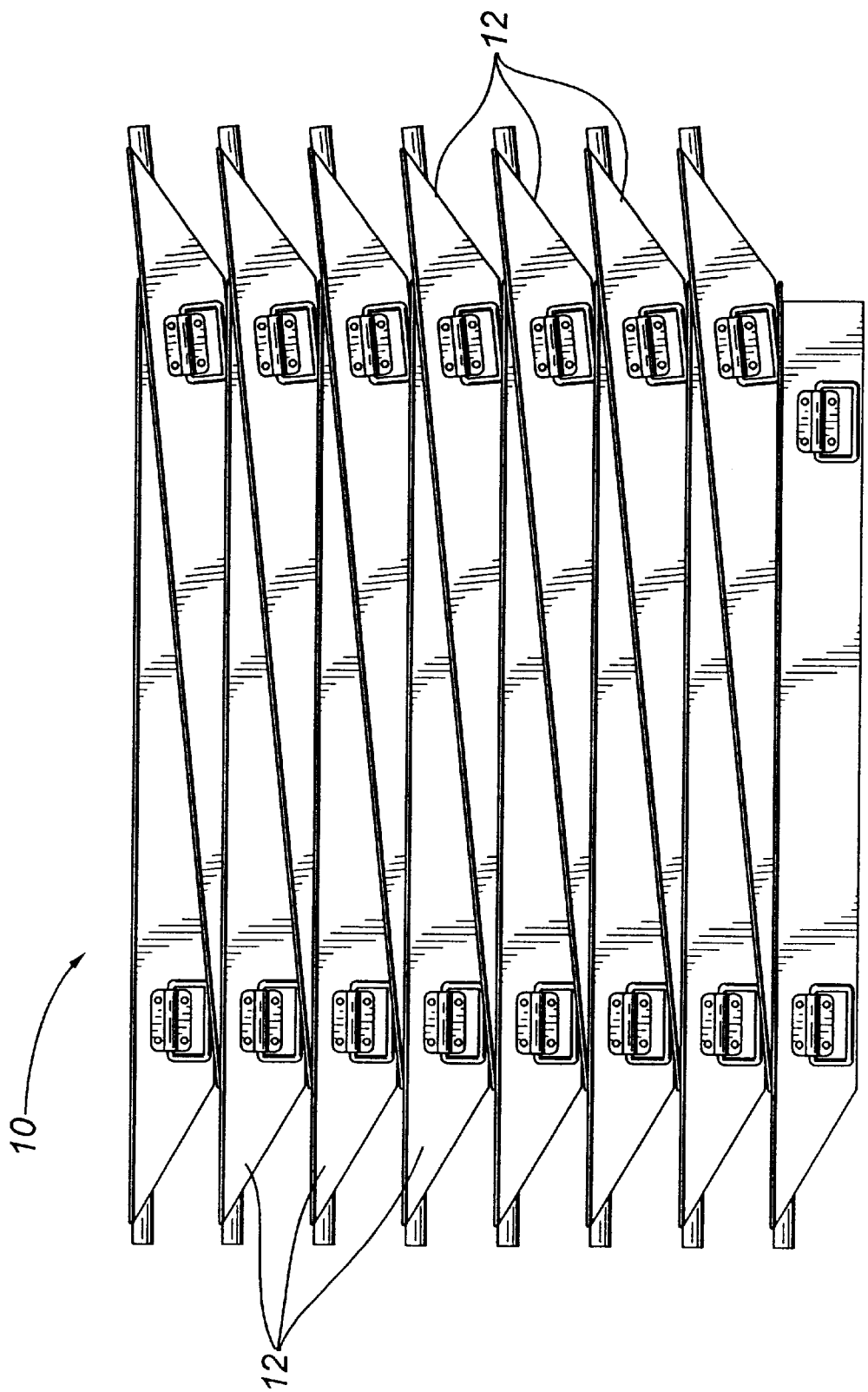
FIG. 2 is a side elevation view of a plurality of drip trays in accordance with the teachings of the prevent invention in a transport mode.

Referring to FIGS. 1 and 2, drip tray 10 consists of a combination of smaller trays 12. In FIG. 1, trays 12 are shown joined together to collectively form drip tray 10. In FIG. 2, trays 12 are shown in a transport mode.

Figure 4:
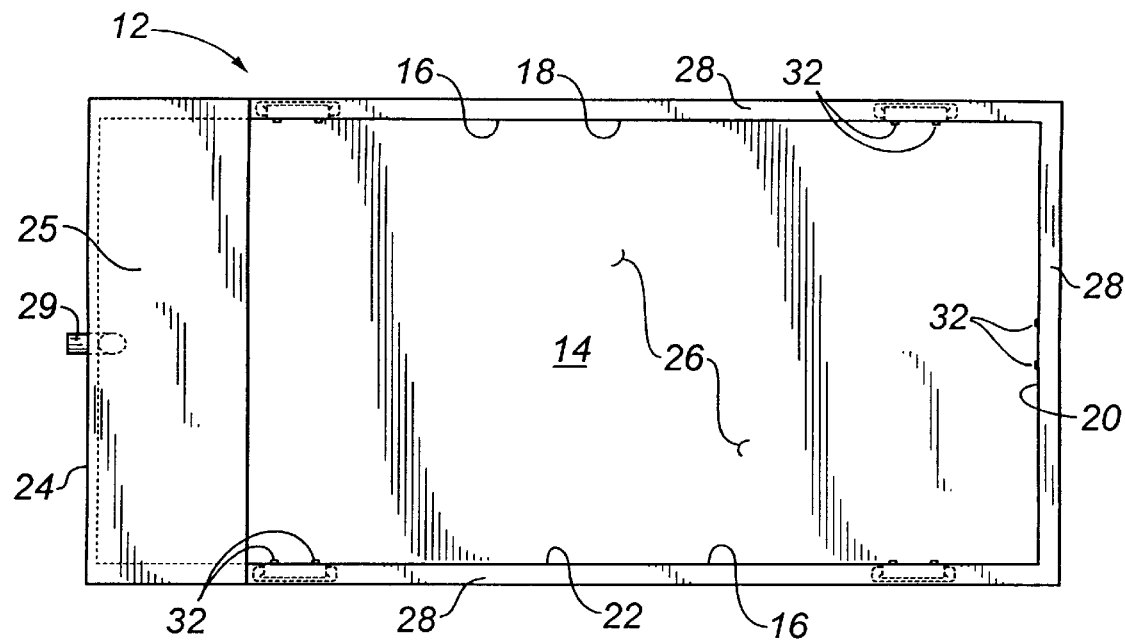
FIG. 4 is a top plan view of an individual one of the drip trays illustrated in FIG. 1.
Figure 5:
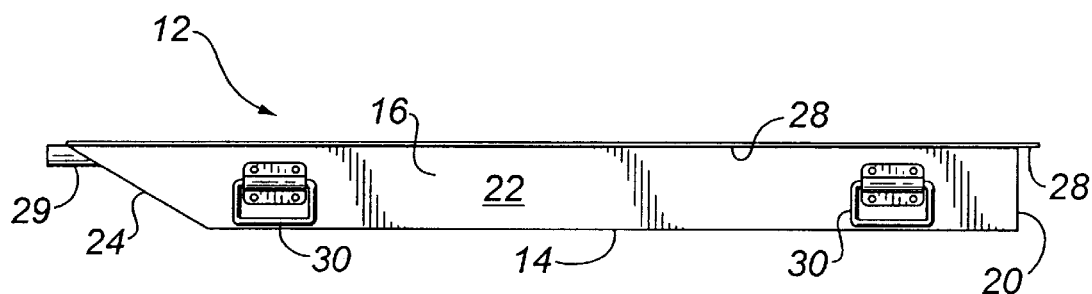
FIG. 5 is a side elevation view of an individual one of the drip trays illustrated in FIG. 1.
Figure 6:
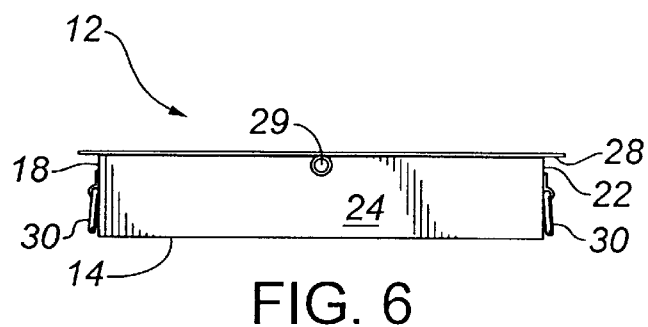
FIG. 6 is an end view of an individual one of the drip trays illustrated in FIG. 1.

Referring to FIGS. 4 through 6, individual trays 12 are illustrated. Referring to FIG. 4, each of trays 12 have a bottom 14 and a raised peripheral sidewall 16 extending from bottom 14 along four sides 18, 20, 22, and 24 to define a liquid retaining enclosure, generally identified by reference numeral 26. Each of trays 12 has an outwardly extending flange 28 positioned along peripheral sidewall 16. Mounted on side 24 is a spout 29 which is used when dumping liquid from tray 12. Side 24 is angled upwardly and outwardly to direct liquid toward spout 29. A cover 25 covers the region of spout 29 to ensure that liquid does not spill over side 24. Referring to FIGS. 5 and 6, handles 30 are secured to and project outwardly from peripheral sidewall 16. Referring to FIG. 4, handles 30 are secured to tray 12 by means of rivets 32. Rivets 32 serve as projecting member, which project inwardly from each of the sidewalls into liquid retaining enclosure 26.

Figure 3:
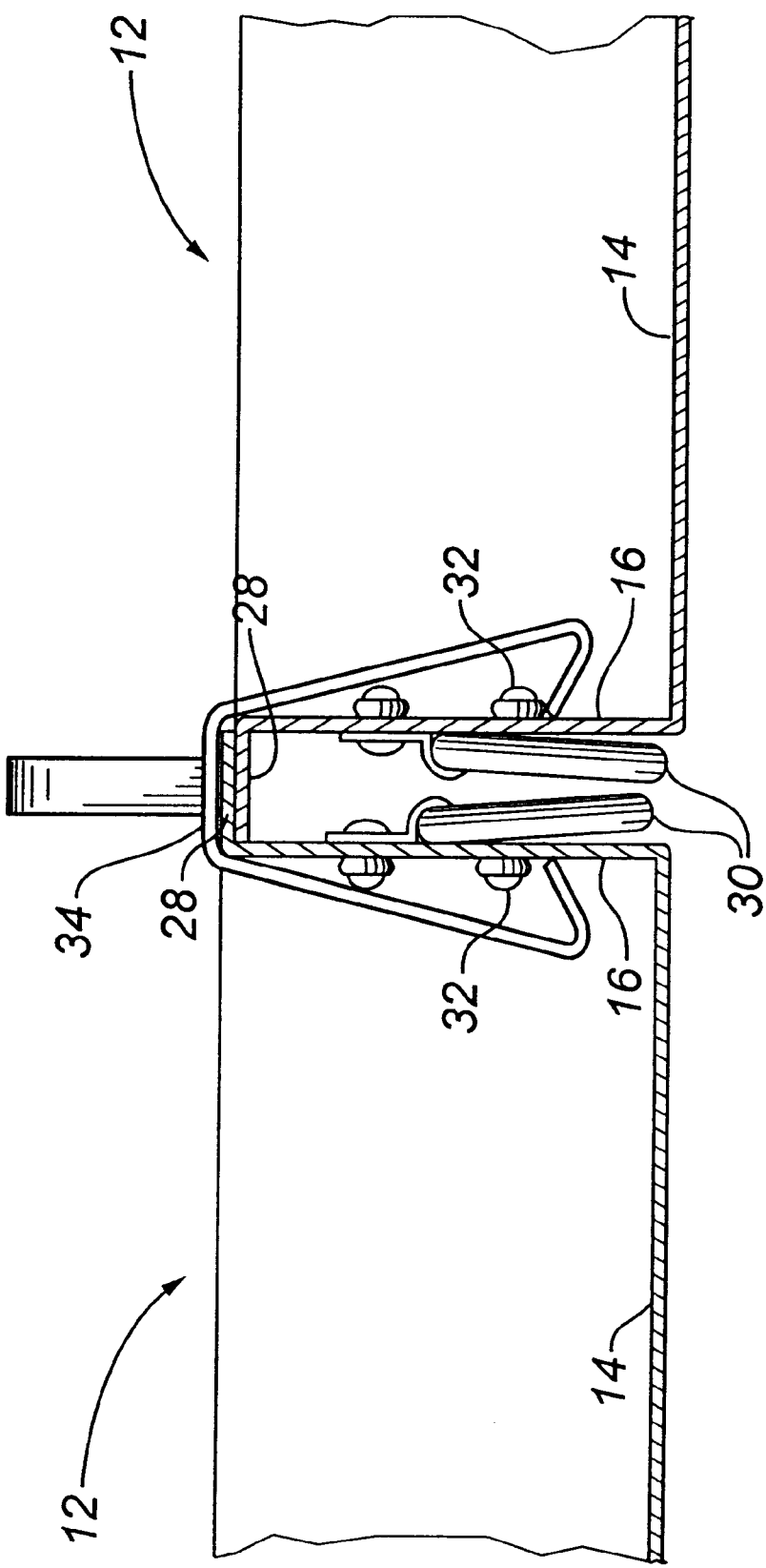
FIG. 3 is a side elevation view, in section, of the connected drip trays illustrated in FIG. 1.

Referring to FIG. 1, trays 12 are arranged in edge to edge relation to form a grid-like pattern with no gaps in between trays 12. Referring to FIG. 3, in order to avoid leakage between trays 12, flange 28 of one of trays 12 overlaps flange 28 of an adjacent one of trays 12. FIG. 3, trays 12 are secured together by jaw-like locking members 34. Jaw-like locking members 34 straddle adjacent trays 12 and engage projecting rivets 32. Referring to FIG. 1, jaw-like locking members 34 secure trays 12 together to form as assemblage of connected trays 12, collectively identified as drip tray 10. In order to assume the position illustrated in FIG. 3, jaw-like locking members 34 either have to be slide into position or have be able to assume open and closed positions. Referring to FIG. 1, there is sufficient space provided between projecting rivets 32 to accommodate jaw-like locking members 34. Jaw-like locking members 34 are slid into position straddling trays 12 and then slid laterally into engagement with projecting rivets 32. In order to dump drip tray 10, jaw-like locking members 34 are removed and trays 12 are individually dumped. In order to dump trays 12, they are tipped so that the liquid runs toward side 24. The liquid running toward side 24 is confined by cover 25 and then directed to spout 29.

It will be apparent to one skilled in the art that modifications may be made to the illustrated embodiment without departing from the spirit and scope of the invention as hereinafter defined in the claims. For example, trays 12, as illustrated, are rectangular. This is viewed as being the most serviceable shape. It will be appreciated by one skilled in the art that a polygon shape could be used, as long as, the individual trays 12 when placed edge to edge can form one continuous drip tray 10.

The embodiments of the invention in which an exclusive property or privilege is claimed are defined as follows:

1. A drip tray, comprising in combination:

a plurality of trays having a bottom and a raised peripheral sidewall extending from the bottom to define a liquid retaining enclosure;

the plurality of trays arranged in edge to edge relation to form a grid-like pattern; and means for detachably securing the trays together in edge to edge relation to maintain the grid-like pattern, including members projecting from the peripheral sidewall of each tray inwardly into the liquid retaining enclosure, and locking members that engage the projecting members of adjacent trays to prevent relative movement.

2. The drip tray as defined in claim 1, wherein a flange is positioned along at least a portion of the sidewall, the flange of one tray overlapping the peripheral sidewall of an adjacent tray.

3. The drip tray as defined in claim 1, wherein the locking members are jaw-like.

4. The drip tray as defined in claim 1, wherein space is left to enable the jaw-like locking members to straddle adjacent trays, the jaw-like locking members then being moved laterally into engagement with the projecting members to preclude the jaw-like locking members from being withdrawn.

5. The drip tray as defined in claim 1, wherein handles are secured to and project outwardly from the peripheral sidewall.

6. A drip tray, comprising in combination:

a plurality of rectangular trays having a bottom and a raised peripheral sidewall extending from the bottom along four sides to define a liquid retaining enclosure, each of the plurality of trays an outwardly extending flange is positioned along the peripheral sidewall;

the plurality of trays arranged in edge to edge relation to form a grid-like pattern, with the flange of one tray overlapping the flange of an adjacent tray;

projecting members at least two of the four sides of each tray projecting inwardly from the peripheral sidewall into the liquid retaining enclosure;

jaw-like locking members straddling adjacent trays and engaging the projecting members, thereby securing the trays together in edge to edge relation to maintain the grid-like pattern.

7. The drip tray as defined in claim 6, wherein handles are secured to and project outwardly from the peripheral sidewall.

\* \* \* \* \*